US011992875B2

(12) United States Patent
Merrill et al.

(10) Patent No.: US 11,992,875 B2
(45) Date of Patent: May 28, 2024

(54) INVESTMENT CASTING CORE WITH COOLING FEATURE ALIGNMENT GUIDE AND RELATED METHODS

(71) Applicant: Siemens Energy Global GmbH & Co. KG, Munich (DE)

(72) Inventors: Gary B. Merrill, Orlando, FL (US); Jose L. Rodriguez, Longwood, FL (US); Megan Schaenzer, Montréal (CA)

(73) Assignee: Siemens Energy Global GmbH & Co. KG, Munich (DE)

( * ) Notice: Subject to any disclaimer, the term of this patent is extended or adjusted under 35 U.S.C. 154(b) by 112 days.

(21) Appl. No.: 17/594,689

(22) PCT Filed: May 22, 2019

(86) PCT No.: PCT/US2019/033519
§ 371 (c)(1),
(2) Date: Oct. 26, 2021

(87) PCT Pub. No.: WO2020/236169
PCT Pub. Date: Nov. 26, 2020

(65) Prior Publication Data
US 2022/0193757 A1 Jun. 23, 2022

(51) Int. Cl.
*B22C 9/10* (2006.01)
*B22C 7/02* (2006.01)
(Continued)

(52) U.S. Cl.
CPC ................ *B22C 9/103* (2013.01); *B22C 7/02* (2013.01); *B22C 9/108* (2013.01); *B22C 9/24* (2013.01);
(Continued)

(58) Field of Classification Search
CPC .. B22C 9/24; B22C 9/10; B22C 9/103; B22C 9/108
(Continued)

(56) References Cited

U.S. PATENT DOCUMENTS 6,557,621 B1 5/2003 Dierksmeier et al.
7,448,433 B2 11/2008 Ortiz et al.
(Continued)

FOREIGN PATENT DOCUMENTS

DE 102008037534 A1 5/2010
FR 2569225 A1 2/1986

OTHER PUBLICATIONS

PCT International Search Report and Written Opinion of International Searching Authority dated Jul. 22, 2019 corresponding to PCT International Application No. PCT/US2019/033519 filed May 22, 2019.

*Primary Examiner* — Kevin P Kerns
(74) *Attorney, Agent, or Firm* — Wolter Van Dyke Davis, PLLC

(57) ABSTRACT

An investment casting core (10) incorporates an alignment guide (24) extending through a body (12) of the core. The alignment guide (24) defines a coolant flow path (92) in a later-cast metal component (76) extending from a coolant outlet opening (90) in an impingement structure (88) to an impingement target area (86) of a cooling feature (84) formed on an impingement cooled surface (82) of the component (76). Methods of making the core (10) and using the core (10) in lost wax investment casting processes are also described.

9 Claims, 2 Drawing Sheets

(51) Int. Cl.
*B22C 9/24* (2006.01)
*F01D 5/18* (2006.01)

(52) U.S. Cl.
CPC .......... *F01D 5/18* (2013.01); *F05D 2230/211* (2013.01); *F05D 2260/201* (2013.01)

(58) Field of Classification Search
USPC .................................................. 164/369, 370
See application file for complete search history.

(56) References Cited

U.S. PATENT DOCUMENTS

| | | | |
|---|---|---|---|
| 8,936,068 | B2 | 1/2015 | Lee et al. |
| 9,132,476 | B2 | 9/2015 | Lee et al. |
| 9,216,451 | B2 | 12/2015 | Lee et al. |
| 9,272,324 | B2 | 3/2016 | Merrill et al. |
| 9,777,581 | B2 | 10/2017 | Hill et al. |
| 9,957,816 | B2 | 5/2018 | Bunker et al. |
| 9,988,922 | B2 | 6/2018 | Friis |
| 10,012,093 | B2 | 7/2018 | Mugglestone |
| 10,022,790 | B2 | 7/2018 | Lee et al. |
| 10,100,737 | B2 | 10/2018 | Little et al. |
| 2015/0096711 | A1 | 4/2015 | Bremmer et al. |
| 2017/0232506 | A1 | 8/2017 | Lee |

INVESTMENT CASTING CORE WITH COOLING FEATURE ALIGNMENT GUIDE AND RELATED METHODS

BACKGROUND

1. Field

The present invention relates generally to the field of investment casting, and more particularly to a method and apparatus for casting advanced cooling features such as are used in gas turbine engine components, and specifically in one embodiment to an investment casting core containing a cooling feature alignment guide.

2. Description of the Related Art

Impingement cooling is often used to cool gas turbine engine components that are exposed to hot combustion gas, for example ring segment shrouds and airfoil leading and trailing edges. The backside of a component surface that is heated by the combustion gas is cooled by one or more jets of cooling fluid directed against the backside surface from holes formed in an impingement structure which is spaced apart from the backside surface. The impingement structure is typically a perforated plate that is manufactured separately and is later attached mechanically or brazed into position after the component is cast. However, problems can arise due to this complex and time consuming assembly process. U.S. Pat. No. 9,777,581 B2 issued to the assignee of the present invention describes a self-locking impingement device which simplifies the installation of an impingement structure into a cast engine component.

Cooling fluid is provided in a gas turbine engine at the cost of efficiency. In order to increase engine efficiency, combustion firing temperatures are periodically increased as material technology and component cooling schemes continue to improve. In order to improve cooling and to minimize the amount of cooling fluid consumed, some modern component designs include the use of engineered cooling features formed on the backside cooled surface to more efficiently transfer heat from the metal surface to the jet of impinging coolant fluid. Further improvements in heat transfer efficiency and reductions in manufacturing and assembly costs are desired.

SUMMARY

The present inventors have recognized that the heat transfer efficiency of engineered impingement cooling features is heavily dependent upon the impinging jet of cooling fluid impacting the cooling feature at the intended impingement target location. The inventors have also recognized that manufacturing and assembly tolerances existing with prior art processes can result in functionally significant misalignment of the impingement structure relative to the associated cooling feature. Accordingly, the inventors disclose herein an investment casting core and related processes which produce the impingement structure in the same casting operation as the cooling feature. This is accomplished by utilizing a casting core incorporating a pre-positioned alignment guide which establishes alignment of a coolant outlet opening in the impingement structure with an associated target impingement area of the cooling feature.

BRIEF DESCRIPTION OF THE DRAWINGS

The invention is explained in the following description in view of the drawings that show.

DETAILED DESCRIPTION

In the following detailed description of the preferred embodiment, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

Figure 1:
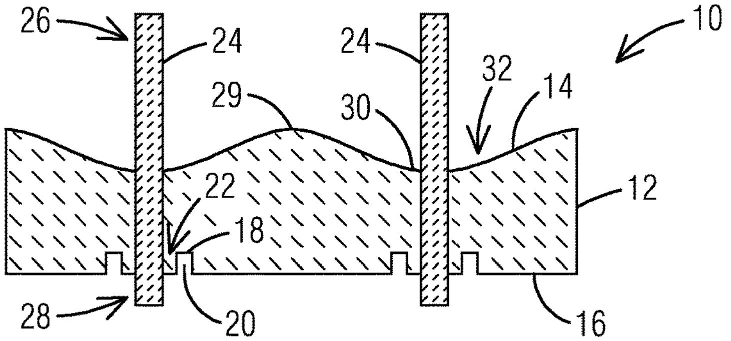
FIG. 1 is a sectional view of an investment casting core in accordance with an embodiment of the invention.

FIG. 1 is a cross-sectional view of an investment casting core 10 in accordance with an embodiment of the invention. The core 10 is used when casting a metal component such as the gas turbine engine component 76 of FIG. 7 in an investment casting process described more fully below with reference to FIGS. 3-6. The core 10 includes a body 12 having an impingement plate side 14 and an impingement surface side 16 opposed the impingement plate side 14. The impingement plate side 14 will define a surface of the impingement structure 88 in the later-cast metal component 76, and the impingement surface side 16 will define an impingement-cooled surface 82 in the later-cast component 76.

In order to increase the efficiency of the impingement cooling scheme of the later-cast component 76, a geometrically engineered cooling feature 84 may be formed on the impingement-cooled surface 82 of the component 76. The shape 18 of the impingement cooling feature 84 is formed on the impingement surface side 16 of core 10. The impingement cooling feature shape 18 is illustrated in FIG. 1 as two recesses 20 separated by an impingement target area 22. It will be recognized by one skilled in the art that the shape 18 in the core 10 is the same as, but a negative of, the shape of the corresponding cooling feature 84 to be formed in the later-cast metal component 76; i.e. the recesses 20 in the core 10 will result in two corresponding protuberances in the later-cast component 76.

The core 10 also includes an alignment guide 24 extending through the body 12 from the impingement target area 22 to the impingement plate side 14. The alignment guide 24 defines a coolant flow path 92 to be formed in the later-cast metal component 76. A portion 26 of the alignment guide 24 extending away from the body 12 beyond the impingement plate side 14 results in a coolant outlet opening 90 being formed in the impingement structure 88 of the later-cast component 76. The opposed end of the alignment guide 24 is positioned in the impingement target area 22 and ensures a precise alignment of the coolant jet and the impingement target area 86 of the later-cast component 76. A portion 28 of the alignment guide 24 may extend away from the body 12 beyond the impingement surface side 16 in order to facilitate manufacture of the core 10, as will be discussed further with respect to FIG. 2 below, although this portion 28 may be removed prior to using the core 10 in a metal casting process.

The impingement plate side 14 of the core 10 is illustrated in FIG. 1 as including a plurality of peaks 29 and valleys 30 relative to the impingement surface side 16. Such a sinusoidal shape in three dimensions may define an auxetic surface shape 32 which exhibits a negative Poisson's ratio, i.e. a structure that will expand both along and transverse to a direction of an applied load. The present inventors have recognized that an impingement structure exhibiting a negative Poisson's ratio may be advantageous in order to control loads for embodiments such as a gas turbine engine component. Moreover, by locating the alignment guide 24 at the apex of a valley 30, the length of the resulting cooling fluid flow path 92 in the later-cast metal component 76 is minimized, thereby maximizing cooling effectiveness. Other embodiments of the invention may utilize a core having a planar, non-sinusoidal, and/or non-auxetic impingement plate side to form an impingement structure having the traditional positive Poisson's ratio.

Figure 2:
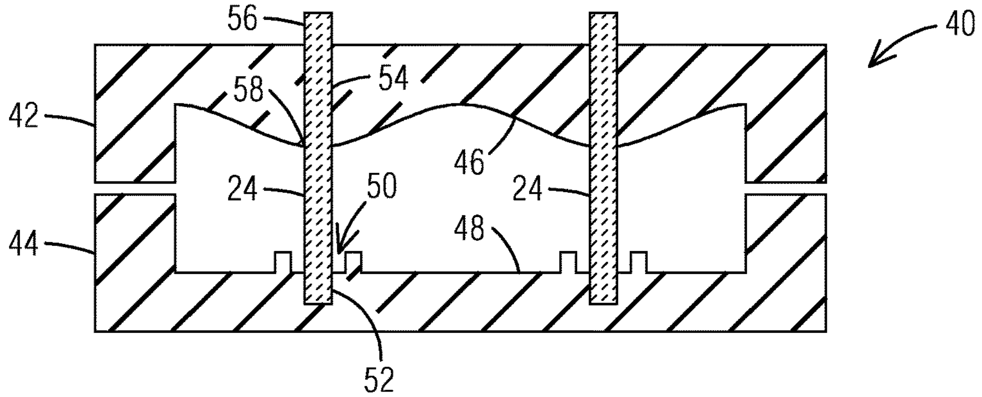
FIG. 2 is a sectional view of a mold used to cast the core of FIG. 1.

FIG. 2 illustrates a core casting mold 40 and a method which may be used to form the core 10 of FIG. 1. The mold may be a flexible mold formed of two or more parts 42, 44 for easy separation and removal of the core 10 after being cast in the mold 40. A first mold part 42 has an interior surface 46 defining the impingement plate side 14 of the core 10, and the second mold part 44 has an interior surface 48 defining the impingement surface side 16 of the core 10, including the impingement cooling feature shape 18 and impingement target area 22. The second mold part 44 includes a first recess 50 corresponding to the location of the impingement target area 22 for receiving a first end 52 of the alignment guide 24. The second mold part 44 includes a second recess 54 for receiving a second end 56 of the alignment guide 24. In the embodiment shown, the second recess 54 is a through hole ending at the apex 58 corresponding to a valley 30 of the core 10. When the two mold parts 42, 44 are joined together, the alignment guide 24 assures that the second recess 54 is perfectly aligned with the first recess 50, which ensures alignment of the coolant jet 92 and impingement target area 86 in the later-cast metal component 76, as will be discussed more fully below.

Core material is introduced into the mold 40, such as in the form of a ceramic slurry, and is allowed to solidify around the alignment guide 24 to form the core 10. The material of the alignment guide 24 is selected to be compatible with the core material, and may be a high density silica material, for example. The alignment guide 24 may have a circular cross section, such as a 2 mm diameter silica rod, or have any other cross-sectional shape desired for the resulting cooling fluid channel 90 in the later-cast metal component 76. After drying/solidifying, the core 10 is removed from the mold 40, sintered and trimmed as necessary, and is available for use in a subsequent metal casting process, as described further below with reference to FIGS. 3-6.

Figure 3:
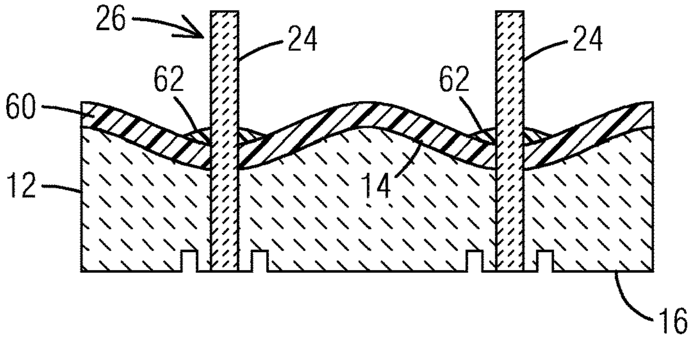
FIGS. 3-6 illustrate steps in a lost wax investment casting process utilizing the core of FIG. 1.

FIG. 3 illustrates the core 10 after its removal from the mold 40 of FIG. 2. A layer of wax such as wax sheet 60 is applied to the impingement plate side 14 of the core 10. The wax sheet 60 will function in a subsequent lost wax process to define a volume of the impingement structure 88 of the later-cast metal component 76. The wax sheet 60 may be separately formed in a flexible mold (not shown) including openings for receiving the portion 26 of the alignment guides 24 extending beyond the impingement plate side 14. The exposed alignment guide portions 26 can be used as an effective anchor for a subsequent shell dip operation described with reference to FIG. 5 below. The portion 28 of the alignment guide 24 extending beyond the impingement surface side 16 in FIG. 1 may be removed (as illustrated in FIG. 3) if desired. To ensure a good seal between the wax sheet 60 and the protruding alignment guides 24, a thin spray coating of wax 62 may optionally be applied over the wax sheet 60 at least in regions surrounding the alignment guides 24.

Figure 4:
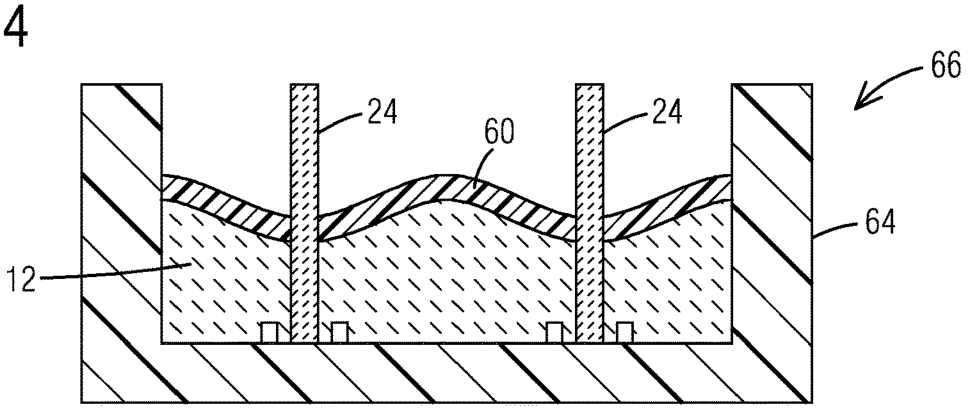

FIG. 4 illustrates the core 10 and layer of wax 60 of FIG. 3 being attached to a wax base 64 to form a wax pattern 66.

Figure 5:
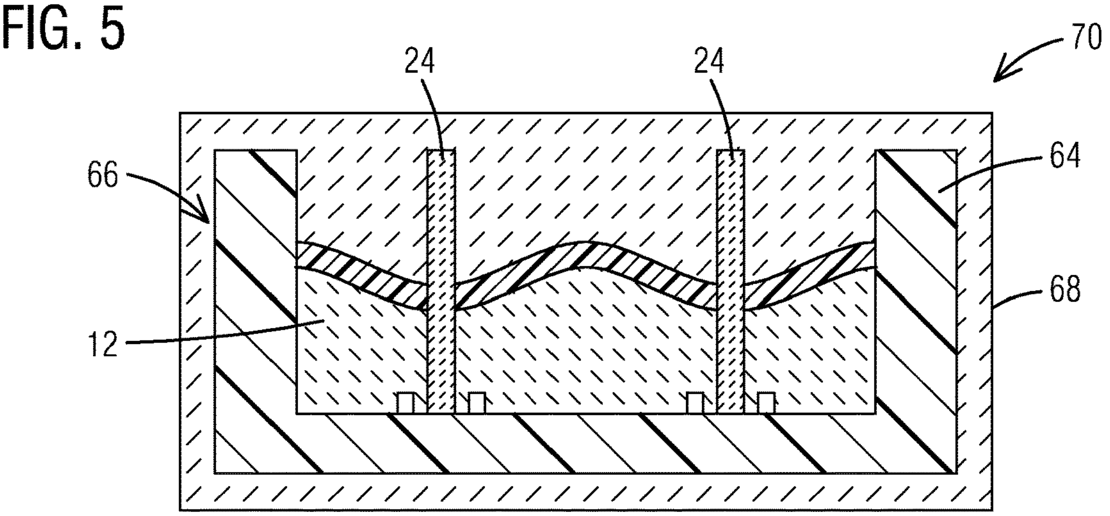
Figure 6:
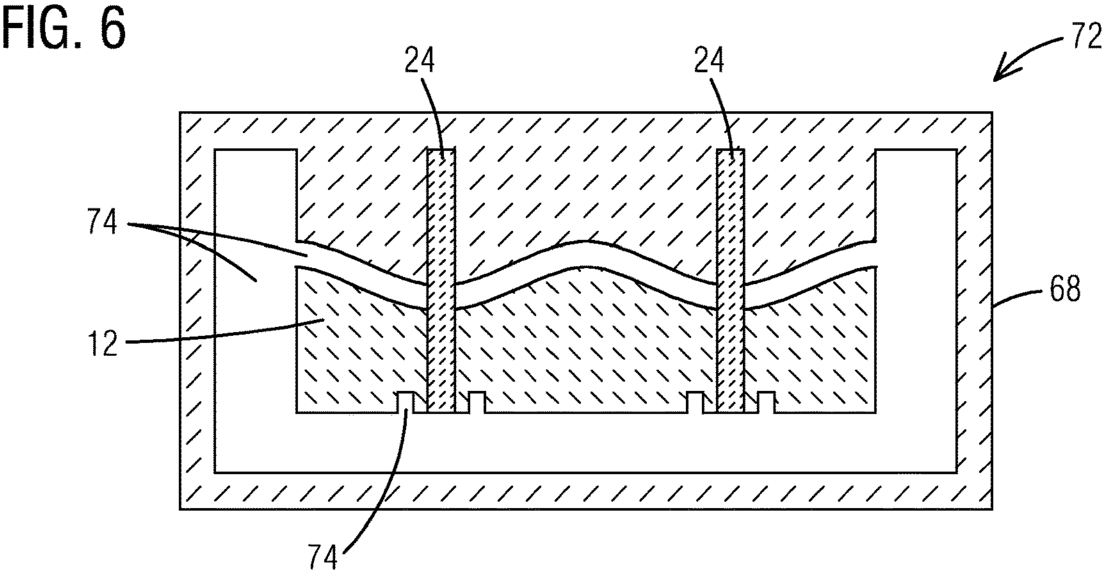

The wax pattern 66 is processed in a standard shelling operation to be encased by a ceramic shell 68, as illustrated in FIG. 5, and the resulting assembly 70 is dried, dewaxed and sintered to form a casting mold 72, as illustrated in FIG. 6. The casting mold 72 includes the core body 12 and alignment guides 24 within the ceramic shell 68 and it defines voids 74 therein having the shape of a desired metal component 76.

Figure 7:
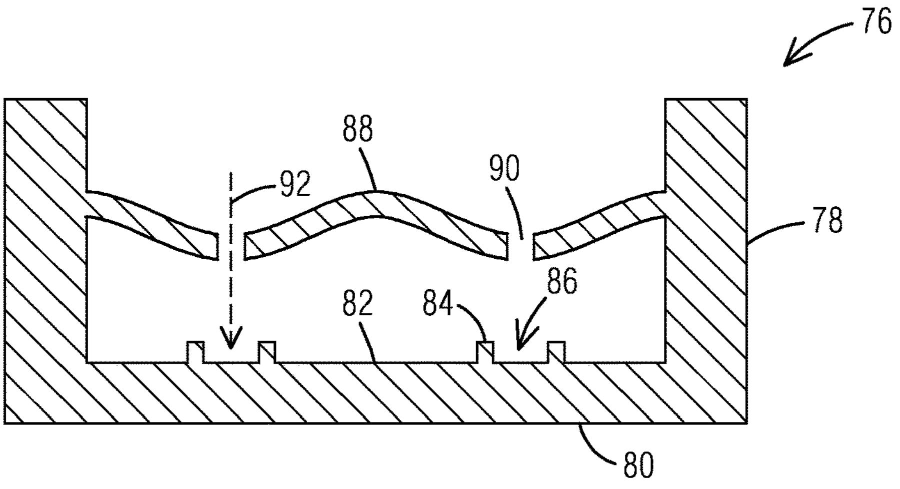
FIG. 7 is a sectional view of a cast metal component formed by the process illustrated in FIGS. 3-6.

The casting mold 72 is then utilized in a metal casting process wherein molten metal is introduced into the voids 74 and allowed to cool and to solidify to form a cast metal component 76. FIG. 7 illustrates the cast metal component 76 after removal of the ceramic casting mold 72. The cast metal component 76 is illustrated as embodiment is a gas turbine engine ring segment having a wall 78 with a surface 80 that will be exposed to a hot combustion gas during operation of the component 76 in a gas turbine engine. The wall 78 includes a backside impingement surface 82 having engineered cooling features 84 with respective impingement target areas 86. The component 76 also includes an impingement structure 88 spaced apart from the impingement surface 82 and including a plurality of coolant outlet openings 90 through which coolant will flow during operation of the component 76 in a gas turbine engine. The presence of the alignment guides 24 in the casting mold 72 defines an impingement jet flow path 92 precisely aligned between each of the outlet openings 90 and a respective impingement target area 86.

Demolding of component 76 from the casting mold 72 can be accomplished by standard mechanical and/or leaching processes. In one embodiment, the ceramic shell 68 is removed by mechanical means, the alignment rods 24 are at least partially drilled out to clear the openings 90 in the impingement structure 88, and then chemical leachate is introduced through the openings 90 for removing the core body 12. Inspection of interior portions of the demolded component 76, including inspection of the cooling features 84 and impingement target areas 86 for proper geometry and complete cleaning, may be accomplished via access through the openings 90 with a borescope or fiber optic inspection tool.

The present invention allows an impingement structure 88 to be cast together with the impingement cooling features 84 on a impingement cooled wall 78 of a component 76, thereby ensuring perfect alignment there between, eliminating the need for separate fabrication and attachment of the impingement structure 88. In this manner, cooling efficiency is optimized and the duration and cost of production can be reduced when compared to prior art methods.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

What is claimed is:

1. A casting mold for use in an investment casting process, the casting mold comprising:

a body (12) comprising an outer surface that defines both an impingement plate side (14) and an impingement surface side (16) opposed to the impingement plate side;

a shape (18) of an impingement cooling feature formed on the impingement surface side, the impingement cooling feature shape defining an impingement target area (22);

an alignment guide (24) extending through the body from the impingement target area to the impingement plate side, and a portion (26) of the alignment guide extending away from the body beyond the impingement plate side; and a shell disposed around the body;

wherein the body and the alignment guide form a core;

wherein the alignment guide comprises a first portion disposed in the shell, a second portion disposed in the body, and a third portion disposed between the first portion and the second portion, wherein the third portion is not disposed in the shell or in the body and is thereby effective to hold the body apart from the shell;

wherein an end of the second portion of the alignment guide (24) terminates flush with the impingement surface side (16);

wherein the core and the shell are configured to form a component therebetween; and wherein the impingement target area constitutes a part of an external surface of the core.

2. The core casting mold of claim 1, wherein the impingement plate side of the body defines peaks (29) and valleys (30) relative to the impingement surface side.

3. The casting mold of claim 2, wherein a valley of the impingement plate side (14) is aligned with the impingement target area (22) by the alignment guide (24).

4. The casting mold of claim 3, wherein the impingement plate side of the body defines an auxetic surface shape (32).

5. The casting mold of claim 1, wherein the impingement plate side of the body comprises an auxetic surface shape (32), and a valley (30) of the auxetic surface shape relative to the impingement surface side is aligned with the impingement target area by the alignment guide.

6. The casting mold of claim 1, wherein the end of the second portion of the alignment guide defines at least part of the impingement target area.

7. The casting mold of claim 1, wherein the body consists of ceramic; and wherein the shell consists of ceramic.

8. The casting mold of claim 1, wherein the body comprises ceramic; and wherein the shell comprises ceramic.

9. The casting mold of claim 1, wherein the first portion of the alignment guide terminates in a blind hole in the shell.

* * * * *